United States Patent
Humphrey et al.

(10) Patent No.: US 9,853,450 B2
(45) Date of Patent: Dec. 26, 2017

(54) POWER FACTOR CORRECTOR POWER SHARING

(71) Applicant: Hewlett-Packard Development Company, L.P., Houston, TX (US)

(72) Inventors: Daniel Humphrey, Cypress, TX (US); Mohamed Amin Bemat, Cypress, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 293 days.

(21) Appl. No.: 14/760,706

(22) PCT Filed: Jan. 21, 2013

(86) PCT No.: PCT/US2013/022375
§ 371 (c)(1),
(2) Date: Jul. 13, 2015

(87) PCT Pub. No.: WO2014/113033
PCT Pub. Date: Jul. 24, 2014

(65) Prior Publication Data
US 2015/0340867 A1    Nov. 26, 2015

(51) Int. Cl.
*H02J 1/00*       (2006.01)
*H02J 3/14*       (2006.01)
(Continued)

(52) U.S. Cl.
CPC ............ *H02J 3/16* (2013.01); *H02J 1/102* (2013.01); *H02J 3/18* (2013.01); *H02M 1/4208* (2013.01);
(Continued)

(58) Field of Classification Search
CPC .... H02J 3/16; H02J 1/102; H02J 3/18; H02M 1/4208; H02M 1/4225; H02M 3/1584;
(Continued)

(56) References Cited

U.S. PATENT DOCUMENTS 6,903,946 B1    6/2005   Wu
7,116,087 B2   10/2006   Zhang et al.
(Continued)

FOREIGN PATENT DOCUMENTS

CN    1756057        4/2006
CN    102332813 A    1/2012
(Continued)

OTHER PUBLICATIONS

ISA/KR, International Search Report dated Oct. 24, 2013, PCT/US2013/022375, filed Jan. 21, 2013, 13pps.
(Continued)

*Primary Examiner* — Carlos Amaya
(74) *Attorney, Agent, or Firm* — Brooks, Cameron & Huebsch, PLLC

(57) ABSTRACT

An apparatus and method alternately transmit power from a first active power factor corrector (22, 122, 222), receiving power from a first alternating current (AC) source (27), and a second active power factor corrector (24, 124, 224), receiving power from a second AC source (28) having at least one line or neutral in common with the first AC power source (27) and in parallel with the first active power factor corrector (22, 122, 222), to a load (30). Current circulation from the first active power factor corrector (22, 122, 222) to the second active power factor corrector (24, 124, 224) and from the second active power factor corrector (24, 124, 224) to the first active power factor corrector (22, 122, 222) is inhibited.

11 Claims, 2 Drawing Sheets

(51) Int. Cl.
  *H02J 3/16*    (2006.01)
  *H02M 1/42*    (2007.01)
  *H02M 3/158*   (2006.01)
  *H02J 1/10*    (2006.01)
  *H02J 3/18*    (2006.01)
  *H02M 7/23*    (2006.01)

(52) U.S. Cl.
  CPC ....... *H02M 1/4225* (2013.01); *H02M 3/1584* (2013.01); *H02M 7/23* (2013.01); *Y02B 70/126* (2013.01); *Y02E 40/30* (2013.01); *Y10T 307/406* (2015.04)

(58) Field of Classification Search
  CPC .... H02M 7/23; Y10T 307/406; Y02B 70/126; Y02E 40/30
  USPC .......................................................... 307/31
  See application file for complete search history.

(56)            References Cited

U.S. PATENT DOCUMENTS

| 7,898,111 | B1  | 3/2011  | Pistel   |           |
|-----------|-----|---------|----------|-----------|
| 8,040,704 | B2  | 10/2011 | Cuk      |           |
| 2002/0011751 | A1 | 1/2002 | Lau      |           |
| 2005/0242751 | A1 | 11/2005 | Chou    |           |
| 2006/0013024 | A1 | 1/2006 | Temesi   |           |
| 2009/0167089 | A1* | 7/2009 | Dishman | H02J 1/10 |
|           |     |         |          | 307/64    |
| 2010/0066171 | A1 | 3/2010 | Thakur et al. | |
| 2011/0110133 | A1 | 5/2011 | Rausch   |           |
| 2011/0169474 | A1 | 7/2011 | Cuk      |           |
| 2011/0254374 | A1 | 10/2011 | Humphrey et al. | |
| 2011/0310647 | A1* | 12/2011 | Humphrey | H02M 3/1584 |
|           |     |         |          | 363/126   |
| 2012/0014150 | A1 | 1/2012 | Domb    |           |
| 2012/0169240 | A1 | 7/2012 | Macfarlane | |

FOREIGN PATENT DOCUMENTS

| CN | 102710010 A | 10/2012 |
| TW | 200925843   | 6/2009  |
| TW | M383870     | 7/2010  |

OTHER PUBLICATIONS

Toshimitsu Morizane; Circulating Current Control of Double Converter System for Wind Power Generation; Power Electronics and Applications (EPE 2011), Proceedings of the 2011—14th European Conference on Aug. 30, 2011-Sep. 1, 2011, 10 pps.

Javier Sebastian et al: "Average-Current-Mode Control of Two-Input Buck Postregulators Used in Power-Factor Correctors", IEEE Transactions on Industrial Electronics, IEE Service Centre, Piscataway, NJ, USA, vol. 46, No. 3, Jun. 1, 1999, XP011023532, ISSN: 0278-0046.

EPO Search Report; Application 13871412.6-1804/2946260—PCT/US2013022375; dated Jul. 21, 2016; 8 Pages.

* cited by examiner

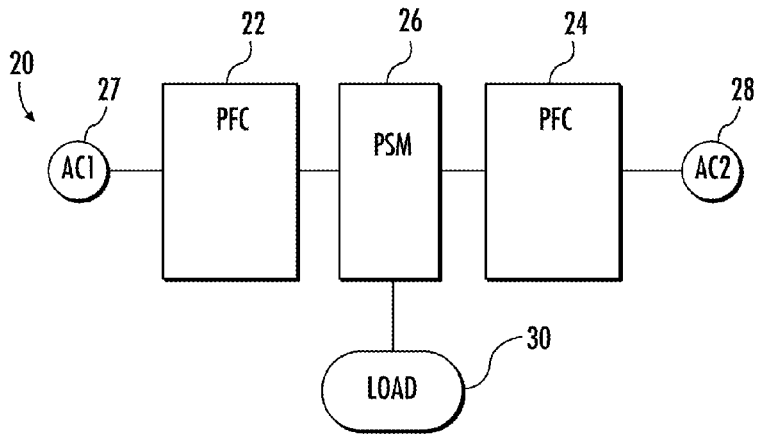
FIG. 1
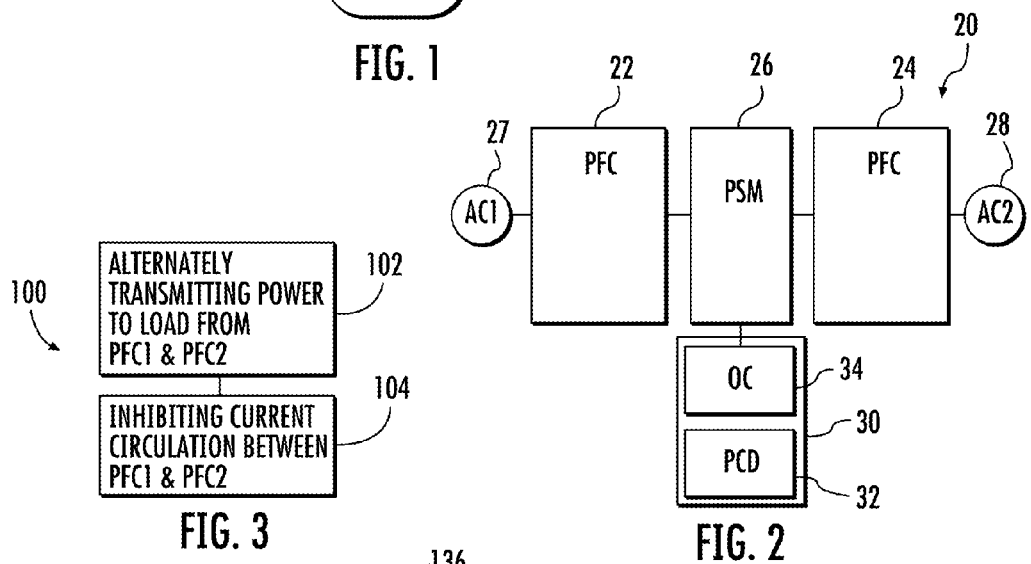
FIG. 3
FIG. 2
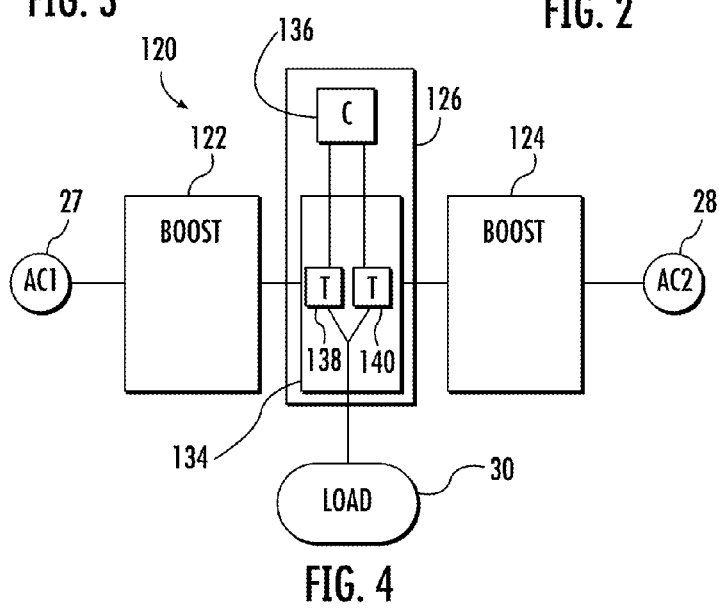
FIG. 4

POWER FACTOR CORRECTOR POWER SHARING

BACKGROUND

Power factor correction is utilized in power transmission systems to reduce transmission losses and improve voltage regulation at a load. Some loads receive power from redundant power supplies having redundant power factor correctors and corresponding redundant output converters. The redundant output converters consume valuable space, reducing power density.

BRIEF DESCRIPTION OF THE DRAWINGS

FIG. 1 is a schematic illustration of an example power factor correction power-sharing system.

FIG. 2 is a schematic illustration of an implementation of the power factor correction power-sharing system of FIG. 1.

FIG. 3 is a flow diagram of an example method that may be carried out by the system of FIG. 1.

FIG. 4 is a schematic illustration of an example implementation of the power factor correction power-sharing system of FIG. 1.

FIG. 6 is a flow diagram of an example method that may be carried out by the system of FIG. 5.

FIG. 8 is a truth table for example control of transistors of a power-sharing manager of the system of FIG. 5.

FIG. 9 is an expanded truth table for example control of transistors of a power-sharing manager of the system of FIG. 5.

DETAILED DESCRIPTION OF THE EXAMPLE EMBODIMENTS

Figure 5:
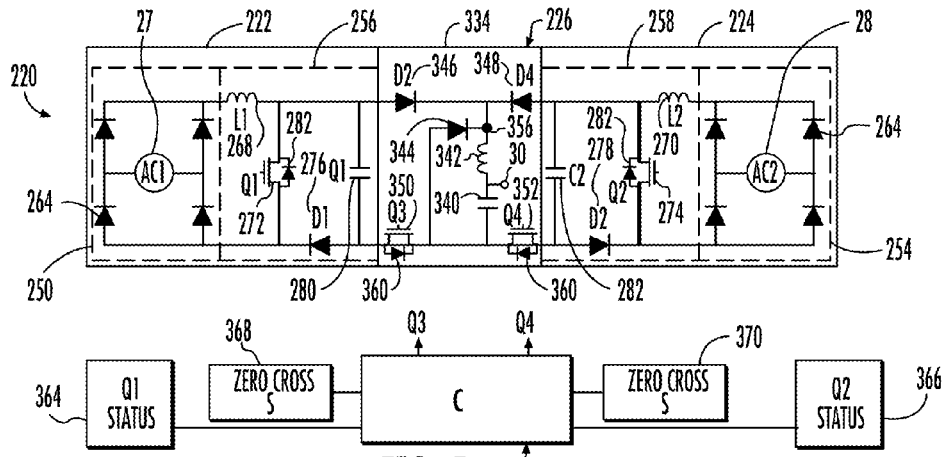
FIG. 5 is a diagram of an example implementation of the power factor correction power-sharing system of FIG. 4.

FIG. 1 schematically illustrates an example power factor correction power-sharing system 20. As will be described hereafter, system 20 facilitates sharing of power from non-isolated power factor corrector converters (power factor correctors). With such power factor correction, voltages are also stepped down. System 20 facilitates use of smaller power conversion components or the elimination of power conversion components to conserve valuable space and increase power density. System 20 comprises power factor corrector 22, power factor corrector 24 and power-sharing manager 26.

Power factor corrector 22 comprises an active power factor corrector for use with alternating current (AC) power source 27. Power factor corrector 24 comprises an active power factor corrector for use with AC power source 28, wherein power sources 27, 28 have at least one line or neutral in common. Power factor correctors 22 and 24 each rectify the alternating current being received and provide power factor correction. Power factor correctors 22 and 24 shape current and maintain an output voltage. In one implementation, each of power factor correctors 22, 24 comprises a boost converter. In other implementations, each of power factor correctors 22, 24 may comprise other power factor correctors such as a buck-boost power factor correction converter and a buck power factor correction converter. Each of power factor correctors 22 and 24 are electrically connected in parallel to power-sharing manager 26.

Power-sharing manager 26 transmits power from power factor correctors 22 and 24, in an alternating manner, to load 30. As shown by FIG. 2, in one implementation, load 30 may comprise a power/energy consuming device 32, such as an enterprise-level server, that receives the power through an output converter 34 sometimes referred to as a switch mode converter) that is electrically connected to power-sharing manager 26. In such an implementation, the output converter 34 provides electrical isolation and produces a desired output voltage (tightening the output voltage range) to satisfy the voltage range of the power/energy consuming device 32. In other implementations, load 30 may omit the output converter 34.

In addition to alternately transmitting power from power factor corrector 22 and 24 to load 30, power-sharing manager 26 steps down voltage from power factor correctors 22 and 24 and inhibits electrical current circulation between power factor correctors 22 and 24. Power-sharing manager 26 inhibits electrical current circulation from power factor corrector 22 to power factor corrector 24 and inhibits electrical current circulation from power factor corrector 24 to power factor corrector 22 to facilitate the alternating supply of power from power factor correctors 22 and 24 to a single load 30 without cross circulating currents. Because power-sharing manager 26 steps down voltage and shares power from two different power factor correctors 22, 24 to a single load 30 with a single output converter 34 or no output converter between power-sharing manager 26 and the load 30 (rather than utilizing two output converters—an output converter between the load and each power factor corrector), power-sharing manager 26 facilitates the elimination of at least one output converter. As a result, power-sharing system 20 conserves valuable printed circuit board real estate or space and facilitates the use of lower voltage, less costly power transmission components. Power-sharing system 20 facilitates intelligent management to provide sharing and fault protection while maintaining high efficiency.

FIG. 3 is a flow diagram of an example method 100 that may be carried out by power factor correction power-sharing system 20. As indicated by step 102, power-sharing manager 26 alternately transmits power to load 30 from power factor corrector 22 and power factor corrector 24. As indicated by step 104, power-sharing manager 26 inhibits current circulation between power factor corrector 22 and power factor corrector 24.

FIG. 4 schematically illustrates power factor correction power-sharing system 120, an example implementation of system 20. System 120 is similar to system 20 except that system 120 is specifically illustrated as comprising power factor correctors 122, 124 and power-sharing manager 126 in place of power factor correctors 22, 24 and power-sharing manager 26, respectively. Power factor correctors 122 and 124 each comprise boost power converters. Power factor corrector 122 comprises a boost power converter for use with AC power source 27 to receive power/energy from AC power source 27. Power factor corrector 124 comprises a boost power converter for use with AC power source 28 to receive power/energy from AC power source 28. As noted above, AC power sources 27, 28 have at least one line or neutral in common with one another.

Power-sharing manager 126 comprises dual input buck converter 134 and controller 136. Dual input buck converter 134 steps down the voltage being transmitted to load 30. Dual input buck converter 134 comprises a pair of transistors 138, 140 (or other switching devices) by which electrical current from boost converters 122, 124 is selectively supplied to load 30. Controller 136 actuates the pair of transistors 138, 140 of the dual input buck 134 to inhibit electrical current circulation between power factor correctors 122 and 124.

In one implementation, controller 136 comprises one or more processing units. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other implementations, controller 136 may comprise hard wired circuitry that may be used in place of or in combination with software instructions to implement the functions described. For example, controller 36 may be embodied as part of one or more application-specific integrated circuits (ASICs). Unless otherwise specifically noted, a "controller" is not limited to any specific combination of hardware circuitry and software, nor to any particular source for the instructions executed by the processing unit.

As with power-sharing manager 26, power-sharing manager 126 inhibits electrical current circulation from power factor corrector 122 to power factor corrector 124 and inhibits electrical current circulation from power factor corrector 124 to power factor corrector 122 to facilitate the alternating supply of power from power factor correctors 122 and 124 to a single load 30 without cross circulating currents. Because power-sharing manager 126 steps down voltage and shares power from two different power factor correctors 122, 124 to a single load 30 with a single output converter or no output converter (rather than utilizing two output converters—an output converter between the load and each of the two power factor correctors), power-sharing manager 126 facilitates the elimination of at least one output converter. As a result, power-sharing system 120 conserves valuable printed circuit board real estate or other space (allowing additional components such as hard drives, memory and the like) and facilitates the use of lower voltage, less costly power transmission components. Power-sharing system 120 facilitates intelligent management to provide sharing and fault protection while maintaining high efficiency.

FIG. 5 is a diagram illustrating power factor correction power-sharing system 220, an example implementation of system 20 or system 120. System 220 comprises power factor corrector 222, power factor corrector 224 and power-sharing manager 226. Power factor corrector 222 comprises an active power factor corrector for use with alternating current (AC) power source 27. Power factor corrector 224 comprises an active power factor corrector for use with AC power source 28, wherein power sources 27, 28 have at least one line or neutral in common. Power factor correctors 222 and 224 are each electrically connected in parallel to power-sharing manager 226. Power factor correctors 222 and 224 rectify AC input and provide power factor correction. Power factor correctors 222 and 224 comprise rectifiers 250, 254 and boost converters 256, 258, respectively.

Rectifiers 250, 254 rectify AC current received from AC power sources 27 and 28, respectively. Rectifiers 250, 254 each comprise full bridge rectifiers, each bridge rectifier including four diodes 264. Although each of power factor correctors 222, 224 is illustrated comprising a full bridge rectifier, in other implementations, power factor correctors 222, 224 may comprise bridgeless power factor boost converters or may use other rectifier technology such as active rectifiers.

Boost converters 256, 258 comprise DC-to-DC power converters having an output voltage greater than an input voltage. Boost converters 256, 258 provide power factor correction, providing a higher power factor. In particular, boost converters 256, 258 comprise active power factor correctors that change the wave shape of current being drawn from AC sources 26 and 28 such that the input currents more closely match to a purely resistive load.

Boost converters 256, 258 are located between bridge rectifiers 250, 254 and power-sharing manager 226. In the example illustrated, boost converter 256, 258 comprise inductors 268 (L1), 270 (L2), boost transistors 272 (Q1), 274 (Q2), diodes 276 (D1), 278 (D2) and capacitances 280 (C1) and 282 (C2), respectively. In the example illustrated, each of transistors 272, 274 comprises a metal-oxide-semiconductor field-effect transistor (MOSFET) transistor additionally provided with an anti-parallel diode 282. In other implementations, transistors 272, 274 may comprise other forms of transistors such as insulated-gate bipolar transistor (IGBT) or bipolar junction transistor (BJT) transistors. In other implementations, anti-parallel diodes 282 may be omitted.

Power-sharing manager 226 transmits power from power factor correctors 222 and 224, in an alternating manner, to load 30. Power-sharing manager 226 comprises dual input buck converter 334 and controller 336. Dual input buck converter 334 steps down voltage being transmitted to load 30 and controls the transmission of power to load 30 from either power factor corrector 222 or power factor corrector 224. Dual input buck converter 334 comprises capacitance 340, inductor 342, diode 344, diode 346 (D3), diode 348 (D4), transistor 350 (Q3) and transistor 352 (Q4). Inductor 342 is electrically connected to capacitor 340 on a first side of capacitor 340. Diode 344 is electrically connected between the second side of capacitor 340 and inductor 342, wherein inductor 342 is electrically connected between diode 344 and capacitance 340. Diode 346 is electrically connected between a positive output of active power factor corrector 222 and a node 356 between diode 344 and inductor 342 with its anode connected to the positive output of power factor corrector 222 and its cathode connected to node 356. Diode 348 is electrically connected between a positive output of active power factor corrector 224 and node 356 with its anode connected to the positive output of power factor corrector 224 and its cathode connected to node 356. Transistor 350 is located between a return of active power factor corrector 222 and the second side of capacitance 340. Transistor 352 is located between a return of active power factor corrector 224 and the second side of capacitance 340. In the example illustrated, each of transistors 350, 352 comprise MOSFET transistors having associated anti-parallel diodes 360. In other implementations, transistors 350 (Q3), 352 (Q4) may comprise other forms of transistors and/or may omit such anti-parallel diodes 360.

Controller 336 generates control signals to selectively open and close transistors 350 (Q3), 352 (Q4) so as to inhibit electrical current circulation between power factor correctors 222 and 224, wherein when a transistor is "closed" the transistor (switch) is on and conducting electrical current. Controller 336 opens and closes each of transistors 350, 352 based upon (A) the status of the other of transistors 350, 352, (B) the status of the boost converter transistors 272 (Q1), 274 (Q2) ("Type 1 circulation"); (C) a determined phase relationship of AC power sources 27, 28 to an output potential or bulk regulation for each of the active power factor correctors 222, 224 ("Type 2" circulation). In the example illustrated, controller 336 receives data signals 364, 366 indicating the status (closed or open) of transistors 272, 274, respectively. In the example illustrated, controller 336 receives zero crossings signals from zero crossing sensors 368, 370 indicating zero crossings of the AC cycle for each of AC power sources 27, 28. Based upon such a zero crossing signals controller 336 determines the phase relationship of the AC power sources 27, 28 to the output potential or bulk regulation for each of the active power factor correctors 222, 224. In other implementations, controller 336 may determine the phase relationship of the AC power sources to the output potential or bulk regulation for each of the active power factor correctors 222, 224 in other fashions. In implementations where a potential between the AC power sources 27, 28 cannot exceed the output potential of each active power factor correctors 222, 224, consideration of or control based upon the Type 2 circulation may be omitted.

FIG. 6 is a flow diagram of an example method 400 for controlling transistors 350 (Q3), 352 (Q4) of the dual input buck converter 334 to supply power to a load 30 alternately from power factor correctors 222, 224 while inhibiting current circulation between power factor correctors 222, 224. As indicated by step 402, controller 336 receives or utilizes signals 364, 366 indicating the status of transistors 272 (Q1) and 274 (Q2). As indicated by step 404, controller 336 determines the region or momentary phase relationship between AC power sources 27, 28. In implementations where a potential between the AC power sources 27, 28 cannot exceed the output potential of each active power factor correctors 222, 224, consideration of or control based upon the Type 2 circulation pertaining to Regions B and C may be omitted in steps 406 and 408.

Figure 7:
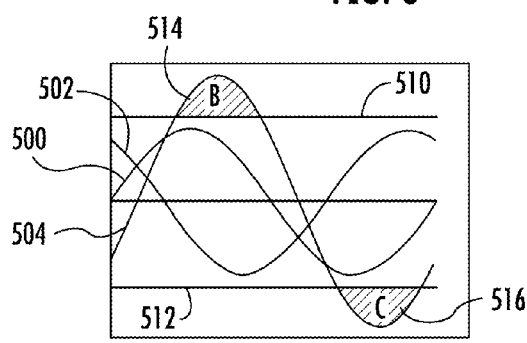
FIG. 7 is a diagram of an example alternating current (AC) cycle for AC power sources of the system of FIG. 5.

FIG. 7 illustrates an example AC cycle for AC power sources 27, 28 and their phase relationship. Line 500 illustrates an example sinusoidal waveform of power from AC power source 27 (for example, line 1 to neutral (N) in a three-phase power source). Similarly, line 502 illustrates an example sinusoidal waveform of power from AC power source 28 (for example, line 2 to neutral (N) in a three-phase power source). Line 508 illustrates the aggregate phase relationship (for example, line 1-line 2 in the three-phase power source). Lines 510 and 512 are reference lines illustrating the times of the AC cycle when the input potential of the AC power sources 27, 28 exceeds the output potential of the power factor correctors 222, 224. Region 514 (Region B) represents the period of time during which the difference or potential between AC power sources 26 and 28 (AC1-AC2) exceeds the output potential of power factor corrector 224. Region 516 (Region C) represents a period of time during which the difference or potential between AC power sources 26 and 28 (AC2-AC1) exceeds the output potential of power factor corrector 222. Using the zero cross signals received from sensors 368, 370 and the predetermined or established sinusoidal waveform characteristics for power provided by AC power source 27 and AC power source 28, controller 336 determines whether or not system 220 is currently and momentarily subject to "Type 2" circulation in region 514 or region 516.

As indicated by step 406 and further represented by the truth tables of FIGS. 8 and 9 (where "X" indicates that the state is irrelevant), controller 336 closes transistor 350 (Q3) to transmit power to load 30 from power factor corrector 222 if transistor 274 (Q2) is closed, if transistor 352 (Q4) is open and if system 220 is not in region B. As indicated by step 408 and further represented by the truth tables of FIGS. 8 and 9, controller 336 closes transistor 352 (Q4) to transmit power to load 30 from power factor corrector 224 if transistor 272 (Q1) is closed, if transistor 350 (Q3) is open and if system 220 is not in region C.

In operation, power-sharing manager 226 allows sharing of power from non-isolated power factor correctors 222 and 224 under all conditions including separate phase, line-to neutral inputs. Diodes 276 and 278, which double as boost diodes, block sneak electrical current paths or electrical circulation through boost transistors 272 and 274 when such transistors are closed. Transistors 350 (Q3) and 352 (Q4) block sneak electrical current paths from a power factor corrector PFCn through capacitance Cn. Diode 348 (D4) blocks the sneak electrical current path from power factor corrector 222 through capacitance 282 (C2). Diode 346 (D3) blocks the sneak electrical path from power factor corrector 224 through capacitance 280 (C1). Diodes 346 and 348 further provide fault isolation for power factor corrector faults. Because the switching of transistors 350, 352 is managed during Type 2 circulation conditions, system 220 blocks sneak electrical paths through capacitance 280, capacitance 340, transistor 350, transistor 352 and diode 278 by opening transistor 352 (Q4) when line to line voltage (AC1-AC2) is greater than the output potential of power factor corrector 222 (capacitance 280) and further blocks sneak electrical paths through capacitance 282, capacitance 340, transistor 352, transistor 350 and diode 276 by opening transistor 350 (Q3) when line to line voltage (AC2-AC1) is greater than the output potential of power factor corrector 224 (capacitance 282).

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
   a first active power factor corrector for use with a first alternating current (AC) power source and comprising:
      a first rectifier;
      a first boost converter with a first capacitance;
   a second active power factor corrector, for use with a second AC power source having at least one line or neutral in common with the first AC power source and comprising;
      a second rectifier;
      a second boost converter with a second capacitance; and
   a power-sharing manager electrically coupled to the first active power factor corrector and the second active power factor corrector to alternately transmit power from the first active power factor corrector and the second active power factor corrector to a load, wherein the power-sharing manager comprises:
- a buck converter to step down voltages of the first boost converter and the second boost converter, the buck converter having a first transistor and a second transistor to prevent circulation of current between the first boost converter and the second boost converter; and
- diodes to prevent circulation of current between the first active power factor corrector and the second active power factor corrector.

2. The apparatus of claim 1, wherein the buck converter is a dual input buck converter.

3. The apparatus of claim 1, wherein the power-sharing manager comprises:
- a capacitance having a first side and a second side;
- an inductor on the first side of the capacitance;
- a first diode, from the diodes, electrically connected between the second side of the capacitance and the inductor, the first diode having an anode connected to the second side of the capacitance and a cathode connected to the inductor, wherein the inductor is electrically connected between the first diode and the first side of the capacitance;
- a second diode, from the diodes, electrically connected between a positive output of the first active power factor corrector and a node between the first diode and the inductor, the second diode having an anode connected to the positive output of the first power factor corrector and a cathode connected to the node;
- a third diode, from the diodes, electrically connected between a positive output of the second active power factor corrector and the node, the third diode connected to the positive output of the second power factor corrector and a cathode connected to the node;
- the first transistor between a return of the first active power factor corrector and the second side of the capacitance; and
- the second transistor between a return of the second active power factor corrector and the second side of the capacitance; and
- a controller controlling the first transistor and the second transistor.

4. The apparatus of claim 3, wherein the first active power factor corrector comprises the first boost converter having a third transistor, wherein the second active power factor corrector comprises the second boost converter having a fourth transistor and wherein the controller controls the first transistor and the second transistor to close the first transistor unless the fourth transistor is open or the second transistor is closed and to close the second transistor unless the third transistor is open or the first transistor is closed.

5. The apparatus of claim 4, wherein the controller controls the first transistor and the second transistor to close the first transistor unless a potential between the second AC power source and the first AC power source exceeds an output of the second active power factor corrector and to close the second transistor unless a potential between the first AC power source and the second AC power source exceeds an output potential of the first active power factor corrector.

6. The apparatus of claim 1 further comprising an output converter for being electrically connected the power-sharing manager and the load.

7. The apparatus of claim 1, wherein the power-sharing manager discontinues power transmission to the load from the first active power factor corrector in response to a potential between the second AC power source and the first AC power source exceeding an output potential of the second active power factor corrector and discontinues power transmission to the load from the second active power factor corrector in response to a potential between the first AC power source and the second AC power source exceeding an output potential of the first active power factor corrector.

8. The apparatus of claim 1, wherein the first active power factor corrector comprises the first boost converter, wherein the second active power factor corrector comprises the second boost converter in parallel with the first boost converter and wherein the power-sharing manager steps down a voltage of the first boost converter and the second boost converter.

9. An apparatus comprising:
- a first active power factor corrector for receiving power from a first alternating current (AC) power source, the first active power factor corrector comprising:
  - a first rectifier;
  - a first boost converter having a first transistor and a first capacitance;
- a second active power factor corrector for receiving power from a second AC power source having at least one line or neutral in common with the first AC power source, the second active power factor corrector comprising:
  - a second rectifier;
  - a second boost converter having a second transistor and a second capacitance; and
- a power sharing manager comprising:
  - a buck converter to step down voltages of the first boost converter and the second boost converter, the buck converter having a third transistor;
  - diodes to prevent circulation of current between the first active power factor corrector and the second active power factor corrector;
  - a fourth transistor, wherein the third transistor and the fourth transistor prevent circulation of current between the first boost converter and the second boost converter via the buck converter;
- a controller controlling the third transistor and the fourth transistor to close the third transistor unless the second transistor is open, unless the fourth transistor is closed or unless a potential between the second AC power source and the first AC power source exceeds an output of the second active power factor corrector and to close the fourth transistor unless the first transistor is open unless the third transistor is closed or unless a potential between the first AC power source and the second AC power source exceeds an output of the first active power factor corrector.

10. A method comprising:
- receiving, at a first active power factor corrector and a second active power factor corrector, power from a first alternating current (AC) power source and a second AC power source having at least one line or neutral in common with the first AC power source;
- correcting a first power factor of the power via a first boost converter of the first active power factor corrector;
- correcting a second power factor of the power via a second boost converter of the second active power factor corrector;
- providing the power to a power-sharing manager;
- stepping down voltages of the power via a buck converter of the power-sharing manager;

preventing circulation of current between the first boost converter and the second boost converter utilizing a first transistor and a second transistor of the buck converter;

preventing circulation of current between the first active power factor corrector and the second active power factor corrector via a plurality of diodes of the buck converter; and alternately transmitting power to a load from the first active power factor corrector and the second active power factor corrector in parallel.

11. The method of claim 10 further comprising discontinuing power transmission to the load from the first active power factor corrector in response to a potential between the second AC power source and the first AC power source exceeding an output potential of the second active power factor corrector and discontinuing power transmission to the load from the second active power factor corrector in response to a potential between the first AC power source and the second AC power source exceeding an output potential of the first active power factor corrector.

* * * * *